324-77 CROSS REFERENCE SEARCH ROOM

May 4, 1965 E. F. FELDMAN ETAL 3,182,254
INTERMODULATION DISTORTION ANALYZER FOR PLOTTING
SECOND AND THIRD ORDER COMPONENTS
Filed Oct. 9, 1961

INVENTORS
BELA RANKY
& EDWARD F. FELDMAN
BY Hurvitz and Rose
ATTORNEYS

United States Patent Office 3,182,254

Patented May 4, 1965

3,182,254
INTERMODULATION DISTORTION ANALYZER FOR PLOTTING SECOND AND THIRD ORDER COMPONENTS

Edward F. Feldman, New Rochelle, and Bela Ranky, Flushing, N.Y., assignors, by mesne assignments, to The Singer Company, a corporation of New Jersey Filed Oct. 9, 1961, Ser. No. 143,793
12 Claims. (Cl. 324—57)

Figure 1:
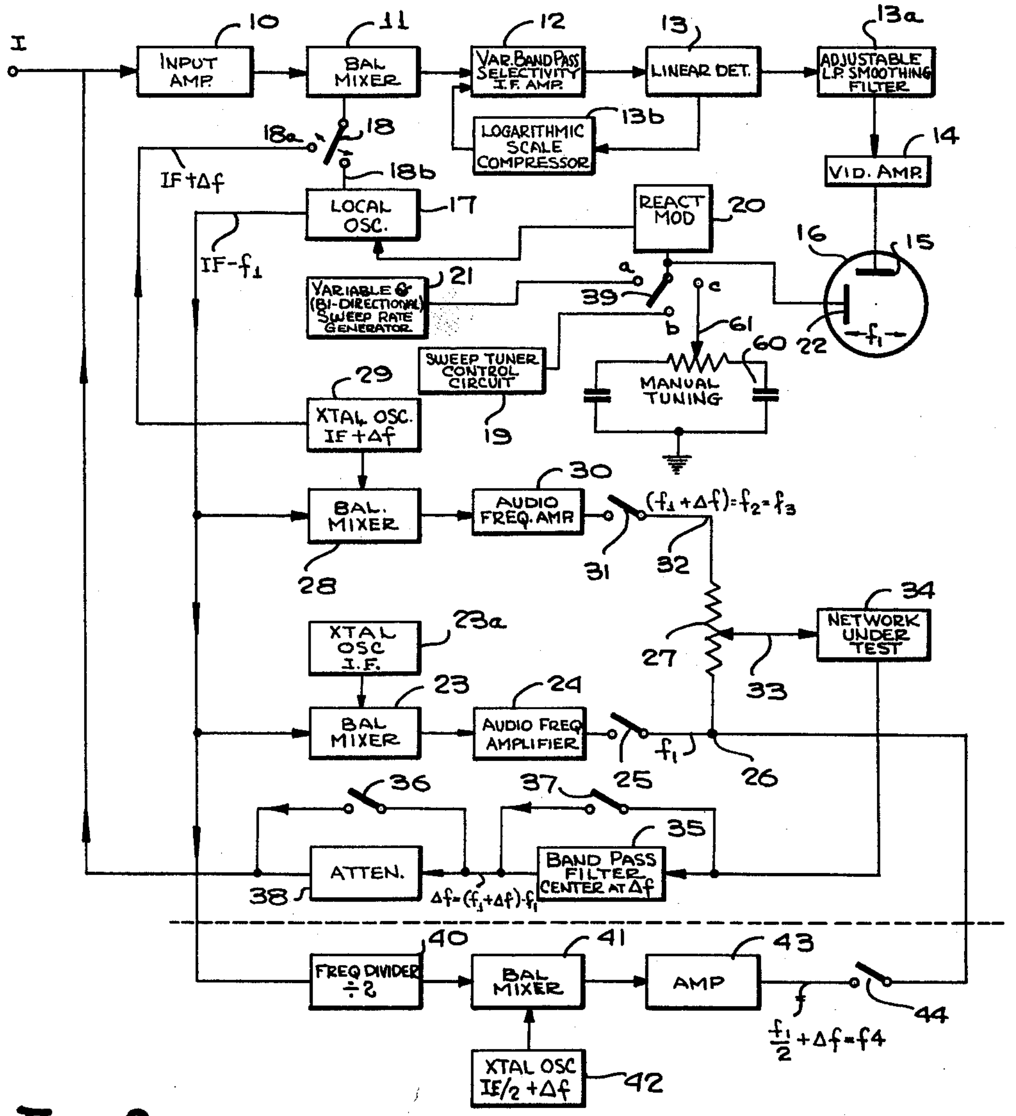

The present invention relates generally to systems for plotting frequency response and distortion producing characteristics of electrical and electro-mechanical devices or systems, and more particularly to instruments capable of plotting the frequency response and second and third order intermodulation distortion components generated by a tested device or system as a function of frequency. Plotting is accomplished by repetitive scanning with a cathode ray tube or chart as readout.

Quantitative evaluation of the quality of various electrical devices or systems, and particularly of sound reproducing equipment and audio amplifiers, requires the measurement of distortion. Measurement of harmonics produced with a single frequency tone input, although easily performed, is insensitive to distortion near the upper end of the useful band. There is conclusive evidence that listeners are more critical of intermodulation than similar relative degrees of harmonic distortion. Ratings of equipment are often in terms of both harmonic and IM characteristics.

One of the more widely used distortion tests is the so-called CCIF or difference tone method. The CCIF method requires a two-tone excitation to the network under test and an amplitude measurement of the difference frequency component. Use of the difference tone permits exploration up to the upper useful limit of the frequency band of interest. Intermodulation is taken as the ratio of amplitudes between the difference frequency component as compared with the sum of the amplitudes of the two desired output frequencies. A related intermodulation distortion measurement of increasing interest involves determination of the third order distortion for the two equal tone excitation. The third order distortion components occur simultaneously with the sum and difference terms. They are related mathematically to the cubic and higher order odd exponent terms in the power series representation of a system transfer function. The third order components are at frequencies $(2f_1-f_2)$ and $(2f_2-f_1)$ where $f_1$ and $f_2$ are the excitation frequencies. Generally, the higher the order of distortion components, the smaller in magnitude they become. However, in systems which have symmetrical transfer functions, the difference term and other even order non-linearities tend to be smaller than odd order components. Examples of systems having symmetrical transfer functions are push-pull amplifiers and tape recorders with symmetrical magnetization curves.

In addition to the problems of measuring each of several types of distortion, there is also the need to evaluate audio devices at various excitation levels and at many frequencies through the audible band. Modern recording and broadcast facilities have pre-emphasis and shaping characteristics which tend to make distortion a distinct function of frequency. Loud-speakers, hearing aids, and other electro-mechanical devices have irregular frequency response characteristics and typically exhibit wide and often critical variations of distortion production with both frequency and level.

Accurate instruments are required for performing the rather complex tests required in complete distortion measurements. An automatic plotter is valuable in that testing time is considerably reduced as compared to point by point tests. The system of the present invention provides a comprehensive test set which plots intermodulation distortion as a function of frequency on a cathode ray tube as well as serving as an automatic harmonic analyzer and a frequency response curve tracer.

The system of the present invention incorporates two slave sweep generators and a sweeping spectrum analyzer as the basic elements. In the plotting tests, the two generators produce tones which sweep through the audio spectrum maintaining a constant difference frequency. The analyzer is conditioned to remain tuned to the difference frequency. In such tests, the analyzer CRT horizontal deflection is proportional to the lower excitation frequency so that the readout represents difference frequency component amplitude vs. lower excitation frequency. With continuously sweeping generators, there is no inadvertent omission of critical input conditions. In production test, visual inspection of the calibrated CRT suffices to check IM characteristics. For permanent records, a photograph of the display or an adjunct chart recorder are used. Guidelines which represent criteria for "go-no-go" acceptance checks are readily inscribed on the CRT. Means for comparisons on alternate scans between a standard and a production sample or between two characteristics of the tested device such as IM and frequency response are included in the system.

According to a working model of the invention, the heterodyne spectrum analyzer is adjusted for CCIF difference tone plotting having front panel controls labeled CENTER FREQUENCY and SWEEP WIDTH so that the swept oscillator excursion corresponds to the required band of excitation frequencies. The useful frequency limits for this instrument are 10 c.p.s. and 22.5 kc. with sweep widths adjustable from 20 to 5,000 c.p.s. Taking any instant during an excursion interval, the sweep local oscillator of the analyzer is generating a frequency equal to $(IF-f_1)$, where $f_1$ is the frequency shown to be the lower excitation component and $IF$=the intermediate frequency of the analyzer. $f_1$ in a repetitive scanning system may be considered a function of time and written as $f_1(t)$. However, as long as the scan speeds are sufficiently small to avoid transient effects, there is no loss of generality in ignoring the time dependence of $f_1$ or the other scanning frequencies mentioned herein. The system described incorporates adjustable scan intervals as great as 80 seconds using an electronic triangular sweep generator and also may be used with an adjunct chart recorder for up to 16 hours/scan. Bi-directional scans, high to low and then low to high in frequency permits rapid visual detection of transient or phase shift errors in measurement. At adequately slow scans, both displays superimpose on the CRFT. $f_1$ is also the frequency to which the analyzer would be tuned at that instant in its normal operating mode as a Fourier analyzer. In the two slave sweep generators, this frequency $(IF-f_1)$ is translated in the spectrum in balanced modulator stages such that output frequencies $f_1$ and $f_2=(f_1+\Delta f)$ are derived where $\Delta f$ is the desired spacing between the two exploring tones. The two generator outputs are linearly combined in a resistive network and adjusted such that their amplitudes are equal prior to injection into the tested device.

A local oscillator frequency in one of the two slave sweep generators corresponds in frequency to the intermediate frequency of the analyzer plus the difference frequency, $\Delta f$. This frequency is used in the analyzer's balanced mixer as substitute fixed local oscillator signal so that the analyzer remains tuned to $\Delta f$. Functionally, this simply requires a switching provision which disconnects the swept local oscillator output from the analyzer balanced mixer and impresses the fixed crystal oscillator output in its place.

As the two test tones sweep with constant difference frequency through the selected excursion, the analyzer responds to the amplitude of the difference frequency component. In the output of the network under test, the two desired tones are present in addition to all distortion components as well as possible noise, power line hum and other frequencies. A bandpass filter is interposed between the tested network and the input to the analyzer so that analyzer overload due to the relatively large tones is avoided. Use of the bandpass filter to attenuate the two main tones extends the linear dynamic range of the CCIF IM measurement beyond the normal 60 db limits of the heterodyne spectrum analyzer. In the unit which has been developed, the IM is measured accurately at more than 80 db down, making it useful with highest quality existing audio networks for IM measurements. It would be quite feasible to design a similar unit with a much greater linear dynamic range.

Selection of a particular difference frequency for IM plots is governed by the type of device being examined. It is desirable to have as low a difference frequency $\Delta f$ as possible thus extending the useful test range from somewhat above the difference frequency to the upper limit of the network response. A low $\Delta f$ also tends to keep the two exploring tone levels from diverging at the output of the device under test. The difference frequency should also correspond to a relatively sensitive point on the tested device frequency response curve to avoid artificially optimistic IM readings. The first equipment of this type was built for a 90 c.p.s. difference frequency for loudspeaker testing. 90 c.p.s. is a particularly desirable value because it falls midway between the 60 c.p.s. and 120 c.p.s. common power line frequency and its harmonics often are found in audio devices due to inadvertent pickup. The hum components are often greater amplitudes than the low level intermodulation component which is to be measured. The selectivity of the spectrum analyzer IF filter is adjustable to 2 c.p.s. bandpass at —3 db providing excellent rejection of the unwanted components. The high degree of selectivity is valuable in loud-speaker tests where the microphone often picks up extraneous broadband background noise. Where possible, test time can be reduced by selecting a broader IF, thus permitting faster scan rates.

To change the difference frequency requires substitution or switching in of a suitable crystal in the local oscillator of one slave sweep generator and a suitable bandpass filter for the new $\Delta f$ ahead of the analyzer.

Operation of the equipment for plotting the difference frequency component alone shows the intermodulation variation with frequency but does not derive a quantitative IM rating. In another operating mode, the test set allows comparison between intermodulation amplitude and single tone acoustic output thus indicating percent IM level vs. frequency.

Readings with this system are made on the calibrated two-decade 40 db decibel Y axis of the cathode ray tube overlay. A variable attenuator is provided which can be set at some convenient value, say 20 db in the signal path, between the network output and the analyzer input. The attenuator is automatically switched out during IM plots so that its setting, e.g. 20 db is to be added to the apparent deflection differences between the two curves. Thus the vertical deflections for frequency response and IM are made commensurate for easy comparison.

Built-in switching circuits alternate the mode of operation of the test set between the acoustic output and IM plotting. Switching is accomplished during the short interval between scans by means of a bi-stable signal alternator. The analyzer "looks at" the lower excitation frequency rather than the difference tone for frequency response tracing. This is accomplished by restoring the swept local oscillator output to the analyzer input mixer and bypassing the bandpass filter. Thus, the composite output signal is injected into the analyzer.

With analyzer selectivity set for a value considerably less than the difference frequency, there is negligible interference due to the presence of the higher exciting tone in the analyzer input stages.

The technique employed in plotting third order vs. frequency is briefly described as follows. As in the IM plot, the heterodyne analyzer remains tuned to a fixed frequency. The two sweep generators sweep across the spectrum at variable speeds such that a constant lower third order term is maintained. One means of accomplishing this is derived as follows.

Let the lower third order term be defined as a constant $$\Delta f=(2f_4-f_3) \qquad (1)$$

where $f_4$ and $f_3$ are the lower and upper excitation frequencies respectively.

$$\therefore f_4=\frac{f_3}{2}+\frac{\Delta f}{2} \qquad (2)$$

It is seen by (2) that the two input tones $f_3$ and $f_4$ are harmonically related except for a constant offset frequency, $\Delta f/2$. One of the slave sweep generators in the CCIF difference tone plotting arrangement generates $(f_1+\Delta f)$ where $f_1$, as before, is the frequency axis calibration point of the spectrum analyzer. It is convenient to use this signal as the upper excitation tone for the third order configuration. Thus, the upper frequency is $$f_3=(f_1+\Delta f) \qquad (3)$$

From (2), $$f_4=\frac{f_1+\Delta f}{2}+\frac{\Delta f}{2}$$

$$\therefore f_4=\frac{f_1}{2}+\Delta f$$

The lower frequency is half the upper plus a constant equal to $\Delta f$, the lower third order frequency to which the analyzer is tuned. For this case, the distortion plot corresponds on the X axis to the upper excitation frequency offset by a constant. By holding the fixed distortion frequency, one generator sweeps at twice the rate of the other through the selected spectrum segment. The difference frequency between the 2 generators constantly varies throughout the scan. At one frequency, the two distortion modes, difference tone and third order coincide, causing an ambiguous measurement. At coincidence $$2f_4'-f_3'=f_3'-f_4'=\Delta f$$

whence $f_4'$, the lower excitation frequency$=2\Delta f$.

For the $\Delta f=90$ c.p.s. offset, the ambiguous point corresponds to the 180 c.p.s. and 270 c.p.s. input frequencies. To avoid errors due to this effect, the useful band of the instrument may be specified as beginning at $2\Delta f$. In other respects, third order measurements are obtained in similar manner to the difference tone operation of the system.

Some circuitry switching is required to condition the test set for third order plotting. One sweep generator remains at $(f_1+\Delta f)$ as in the difference tone tests. In the other generator a binary divider is added to the path of the swept local oscillator path just ahead of the generator's mixer. Thus a frequency of $$\frac{IF-f_1}{2}$$

is derived from $(IF-f_1)$. The fixed local oscillator frequency is charged by switching quartz crystals from IF to $(IF/2+\Delta f)$. The difference frequency then is $(f_1/2+\Delta f)$ is required. The $(IF+\Delta f)$ local oscillator frequency of the former generator remains as the signal fed to the analyzer balanced mixer so that the analyzer stays tuned to $\Delta f$, the lower third order component.

Other configurations using dividers and frequency offsets are readily available for the third order two-tone synthesis.

Another means of obtaining the signals for third order plot is to utilize a frequency doubler rather than a binary divider in one sweep generator circuit to obtain $2(IF-f_1)$. The necessary crystal oscillator frequency is then twice the intermediate frequency plus the offset, $\Delta f$, or $2IF+\Delta f$. The difference tone is $(2f_1+\Delta f)$. The other output is taken as before as $(f_1+\Delta f)$. The lower third order component of these two signals is $\Delta f$ as required. The advantages of the doubler method over the divider method are that the frequency calibration relates closely to the lower excitation tone as in the difference tone method and that twice as much sweep width is obtained for a given analyzer local oscillator excursion. However the doubler is more difficult to build.

An important design requirement for third order tests is low second harmonic content of the lower frequency component. Twice the lower frequency is removed from the upper term by $\Delta f$, the offset frequency. Difference frequency distortion in the tested device caused by interaction between the second harmonic of the lower input frequency and the upper input frequency would be sensed by the analyzer and be indistinguishable from the third order products.

It is accordingly, a broad object of the present invention to provide a system for automatically plotting third order intermodulating response of a system under test as a function of test frequency, where the latter scans selected segments over a wide range.

It is another object of the present invention to provide a system for utilizing a frequency scanning superheterodyne spectrum analyzer as a third order intermodulation plotter.

A further object of the invention resides in the provision of a system for at will plotting direct response of a system under test to a scanning frequency, or various intermodulation responses of the system to a pair of scanning frequencies.

Figure 2:
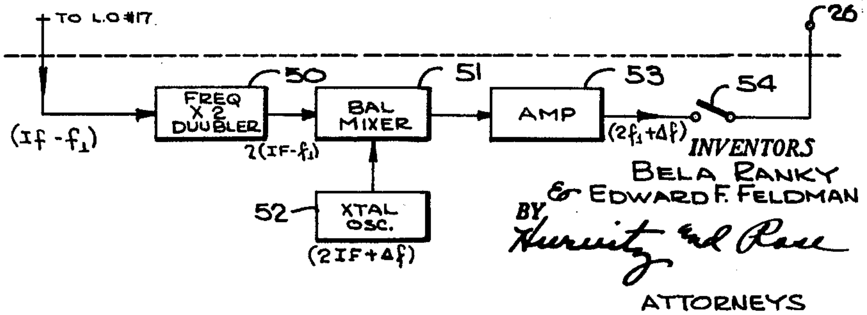

The above and still further objects, features and advantages of the present invention will become apparent upon consideration of the following detailed description of one specific embodiment thereof, especially when taken in conjunction with the accompanying drawings, wherein:

FIGURE 1 is a block diagram of an intermodulation plotter according to the invention; and FIGURE 2 is a block diagram of a modification of the system of FIGURE 1.

Referring now to the drawings, the reference numeral 10 denotes an input amplifier for an audio spectrum analyzer, covering the band 10 c.p.s. to 22.5 kc., for example. The signal provided by amplifier 10 is applied to a balanced heterodyne mixer 11, to which may be applied local oscillator signal for converting the input frequency to a suitable value, IF, say 100 kc. The latter frequency is selected and amplified in a highly selective band-pass amplifier 12, having provision for variable selectivity control, and the output of the latter detected in peak detector 13. The detected output is filtered in an adjustable low pass smoothing filter, 13*a*, and amplified in video amplifier 14, and the amplified video signal applied to the vertical deflection electrode 15 of a cathode ray tube indicator (CRT) 16. A logarithmic scale compressor 13*b* is provided in a feedback circuit between detector 13 and amplifier 12 to produce a more suitable scale on CRT 16.

The instrument is provided with a local oscillator 17, which supplies the local oscillator signal, and can be connected to mixer 11 via selector switch 18 having terminals 18*a* and 18*b*. The local oscillator 17 is tuned by a reactance tube 20. Reactance tube 20 is controlled via a selector switch 39 by any one of three control circuits. These control circuits are: a bi-directional sweep generator 21 at switch position *a*, sweep tuner control 19 at switch position *b*, or a tuned circuit 60 having a manual control 61 at switch position *c*. The output of the selected one of control circuits 19, 21 or 60 is applied to the horizontal deflection electrode 22 of CRT 16, to provide a frequency base line.

The system as described by reference to the accompanying drawings represents a conventional heterodyne spectrum analyzer, such as is described in the U.S. Patent to Tongue, #2,661,419, and can be utilized to perform the normal function of a spectrum analyzer.

The local oscillator frequency, $IF-f_1$, where $f_1$ is the input frequency range, normally scans over the frequency range extending from 10 c.p.s. to 22.5 kc., in selected linear segments, and thereby can convert $f_1$ to IF, during each scan, for every value of $f_1$ present in a complex signal applied to input terminal I. Thus input signal frequencies within the $f_1$ scan excursion are analyzed.

The output of local oscillator 17 may be applied to a first balanced mixer 23, to which is also applied the output of a crystal oscillator 23*a* of frequency IF. The difference frequency output of the balanced mixed 23 is thus $f_1$, where $f_1$ scans over the audio band in exact synchronism with local oscillator 17 as it sweeps over its assigned range, i.e. $f_1$ sweeps in the 20 c.p.s. to 22.5 kc. band. The signal $f_1$ is selected by an audio amplifier 24 and applied at will via a switch 25 to one terminal 26 of a potentiometer 27.

The output of local oscillator 17 is also applied to a second balanced mixer 28, to which is applied a fixed frequency signal from a crystal oscillator 29, said fixed frequency having a value $(IF+\Delta f)$, where $\Delta f$ may have a relatively low value, say 90 c.p.s. in an exemplary equipment. The difference frequency output of balanced mixer 28 is selected by audio amplifier 30, and has a value $(f_1+\Delta f)$, where $\Delta f$ is fixed, but $f_1$ scans in frequency in synchronism with the sweep of local oscillator 17. There thus exists at all times a frequency difference $\Delta f$, as between the outputs of amplifiers 24 and 30.

The output of amplifier 30 is applied through a switch 31 to terminal 32 of potentiometer 27. Slider 33 of the latter is adjusted to provide equal outputs at frequency $f_1$ and $f_1+\Delta f$, for application to a network under test 34. The latter may be a loud speaker, an audio amplifier, or any other device or combination of devices which may be expected to introduce IM distortion.

The output of network 34 is filtered in a narrow band-pass filter 35, which is arranged to centrally select and pass the frequency $\Delta f$, which represents second order IM distortion, i.e. $(f_1+\Delta f)-f_1$. The output of filter 35 is passed via a switch 36 when closed to the mixer 11 via input amplifier 10. The output of crystal oscillator 29 is applied to the mixer 11 via closed terminal 18*a* of switch 18.

Since crystal oscillator 29 provides a fixed frequency $IF+\Delta f$, and since the second order difference tone (CCIF) IM product provided by network 34 is at fixed frequency $\Delta f$ regardless of the value of $f_1$, the heterodyne frequency supplied to IF amplifier 12 by mixer 11 is always IF. Since the excitation frequencies $f_1$ and $(f_1+\Delta f)$ are of constant amplitude and the system amplitude frequency response is flat, the IF signal is proportional in amplitude to the amplitude of $\Delta f$. The plot on the face of CRT 16 tracks with $f_1$, or represent a graph of $f_1$ versus $\Delta f$.

Upon opening the switch 31, leaving switch 25 closed, the network 34 is supplied with the frequency $f_1$ only. In such case, switch 37 is closed to by-pass band-pass filter 35. The switch 36 is opened to introduce a suitable exemplary attenuation of 20 db at an attenuator 38, and the input to mixer 11 via amplifier 10 is then $f_1$, attenuated 20 db and also modified by passage through network 34. The selector switch 18 is closed to contact terminal 18*b*. The heterodyning frequency supplied by local oscillator 17 is thus supplied to mixer 11, equal to $(IF-f_1)$. The mixer 11 then develops the frequency $(IF-f_1)+f_1$, or IF, during the entire scan.

The plot developed on the face of CRT 16 is a direct response characteristic of network 34 plotted against $f_1$ which can be readily compared point by point with the IM plot. The 20 db attenuation or other suitable value introduced by attenuator 38 renders the direct response and the IM distortion of comparable deflection amplitudes, for easy comparison. A simple switch circuit (not shown) which is triggered at the scan rate, permits both plots to be visualized in succession on the CRT.

In order to plot third order IM distortion versus frequency $f_1$, the output of local oscillator 17 is divided by two, in divider 40, providing a frequency $\frac{1}{2}(IF-f_1)$. This frequency is supplied to balanced mixer 41, to which is also supplied the output of a crystal oscillator 42, at frequency $$\left(\frac{IF}{2}+\Delta f\right)$$

The difference tone output frequency is then $$\left(\frac{f_1}{2}+\Delta f\right)=f_4$$

This frequency is applied via amplifier 43 and switch 44, now closed, to terminal 26, switch 25 being open and 31 closed. Tracking frequencies $(f_1+\Delta f)$ and $$\left(\frac{f_1}{2}+\Delta f\right)$$

are now presented to the network 34 under test.

The third order IM distortion components are defined by twice one excitation frequency less the other. In this case the lower third order component is monitored. In this instance subtraction of $(f_1+\Delta f)$ from $$2\left(\frac{f_1}{2}+\Delta f\right)$$

provides $$2\left(\frac{f_1}{2}+\Delta f\right)-(f_1+\Delta f)=\Delta f$$

a constant.

The frequency $\Delta f$ is selected by filter 35 as before and with switch 37 open and switch 36 closed is directly passed to the input of amplifier 10.

Switch 18 is closed to terminal **18*a* to provide a heterodyne sweep frequency $(IF+\Delta f)$, from crystal oscillator 29. Conversion then takes place in mixer 11** such that $\Delta f$ is converted to the IF.

The several switches 18, 25, 31, 36 and 37 may be manipulated automatically to provide successive plots of direct response, difference tone, second order IM distortion, and third order IM distortion, on the face of CRT 16 by providing inputs therefrom to a flipflop circuit synchronized by the sweep rate generator 21.

The third order plot is not directly comparable in amplitude against a frequency axis provided for the other plots even after suitable amplitude corrections or calibrating factors are introduced, since this third order IM plot is made with respect to the upper excitation frequency offset by a constant frequency. However where $\Delta f$ is small compared with the excitation frequencies, a reasonable aproximation to the upper tone is represented by the X axis.

In accordance with a modification of the present invention, illustrated in FIGURE 2 of the accompanying drawings, the divider 40 is replaced by a multiplier-by-two, 50. The output of the latter is heterodyned in a balanced mixer 51 with the output of a crystal oscillator 52, providing a frequency $2IF+\Delta f$. The product of balanced mixer 51 includes $2(IF-f_1)\pm(2IF+\Delta f)$, which includes $2f_1+\Delta f$. This is in distinction to the system of FIGURE 1, wherein the corresponding output is $$\frac{f_1}{2}+\Delta f$$

In the system of FIGURE 2, the signal component $2f_1+\Delta f$ is applied, via amplifier 53 and switch 54 to terminal 24 of FIGURE 1, to provide a frequency component $f_1$ deriving from network 31, at amplitude proportional to third order IM distortion. The advantage of the system of FIGURE 2 over that of FIGURE 1 is that frequency calibration relates to the lower frequency $f_1$, and that twice as much sweep width is attained than in the system of FIGURE 1. The offsetting disadvantage is that a broad band doubler is more expensive to construct than a two-divider.

It will be clear, by varying the multiplication factor introduced by multiplier 50, FIGURE 2, or the division factor introduced by divider 40, FIGURE 1, i.e. by varying the factor $n$, that further orders of IM distortion may be plotted. In addition the frequency $f_1$ may be divided or multiplied by factors $m$ and $n$, where $m$ and $n$ are different, $\Delta f$ being added to one of the products only, to provide plots of various orders of IM distortion.

Provision is also made for disabling the sweep circuits 19 or 21 and switching to a manual sweep control circuit 60, so that the local oscillator 17 may be varied over a small range of frequency manually. Thereby, the response of network 34 under test may be examined at any single frequency, $f_1$, or frequencies adjacent thereto, by manipulation of the control 61 of manual sweep 60.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. In a system for measuring distortion of a device under test, a first mixer, a narrow band selective circuit connected in cascade with said first mixer, said selective circuit having a pass band centered on frequency IF, means for presenting a plot of signal output of said selective circuit as a function of frequency, said last means including a scanning local oscillator, and means for at will connecting said local oscillator to said mixer, said local oscillator scanning over a frequency range, means responsive to said local oscillator for generating two synchronously scanning local signals $f_1$ and $f_1\pm\Delta f$, where $\Delta f$ is a fixed frequency, means for applying said scanning local signals jointly to said device under test, means for selecting the frequency $\Delta f$ from the output of said device under test continuously in response to scanning of said scanning local signals, means for applying said frequency $\Delta f$ to said first mixer, and means applying a fixed frequency equal to IF$\pm\Delta f$ to said first mixer.

2. In combination, in a system for measuring third order intermodulation distortion generated by a device under test, means generating a first signal of frequency $f_1+\Delta f$, where $\Delta f$ is a fixed frequency and $f_1$ is a scanning frequency, means generating a second signal of frequency $nf_1$, where $n$ is seleced from the values $\frac{1}{2}$ and 2, means for applying said first and second signals jointly to said device under test and for deriving therefrom a response at frequency $\Delta f$, and means for plotting the amplitude of said response as a function of frequency directly related to said scanning frequency $f_1$.

3. In combination, in a system for measuring third order intermodulation distortion generated by a device under test, means for generating a first scanning signal of frequency $f_1+\Delta f$, where $f_1$ is a scanning frequency and $\Delta f$ is a fixed frequency, means for generating a second scanning signal of frequency $f_1/2$, means for applying said scanning signals jointly to said device under test, means for selecting only signals at frequency $\Delta f$ from the responses of said device under test to said scanning signals, and means for plotting the amplitudes of said signals at frequency $\Delta f$ as a function of frequency related to $f_1$.

4. In combination, in a system for measuring third order intermodulation distortion generated by a device under test, means for generating a first scanning signal at frequency $f_1+\Delta f$, where $f_1$ is a scanning frequency and $\Delta f$ is a fixed frequency, means for generating a second scanning signal of frequency $2f_1+\Delta f$, means for applying said scanning signals jointly to said device under test, means for selecting only signals at frequency $\Delta f$ from the responses of said device under test to said scanning signals, and means for plotting the amplitudes of said signals at frequency $\Delta f$ as a function of $f_1$.

5. In combination, in a system for measuring intermodulation distortion generated by a device under test, means for generating a first scanning signal at frequency $f_1+\Delta f$, where $f_1$ is a scanning frequency and $\Delta f$ is a fixed frequency, means for generating a second scanning signal at frequency $f_1$, means for generating a third scanning signal at frequency $nf_1$, where $n$ is selected from values ½ and 2, means for at will selectively applying any two of said scanning signals including said first scanning signal to said device under test, means for continuously selecting only signals at frequency $\Delta f$ from the responses of said device under test to said two of said scanning signals, and means for plotting the amplitudes of said signals at frequency $\Delta f$ as a function of $f_1$.

6. In combination, in a spectrum analyzer, a source of scanning local oscillator signal of frequency $IF-f_1$, where IF is a fixed frequency and $f_1$ is an audio frequency variable between two values, means responsive to said local oscillator signal for generating signals of frequencies $f_1$, $f_1+\Delta f$ and $nf_1+\Delta f$, where $\Delta f$ is a fixed frequency and $n$ is selected from the values 2 and ½, a device under test, said device having direct response to signals of frequency $f_1$, and intermodulation responses to signals of frequency $f_1$ and $f_1+\Delta f$, and to signals of frequency $f_1+\Delta f$ and $nf_1$, and means for at will plotting any selected one of said responses.

7. In combination, in a system for measuring responses generated by a device under test, means for generating a first scanning signal at frequency $f_1+\Delta f$, where $f_1$ is a scanning frequency and $\Delta f$ a fixed frequency, means for generating a second scanning signal at frequency $f_1$, means for generating a third scanning signal at frequency $nf_1+\Delta f$, where $n$ is selected from values ½ and 2, means for at will applying either said second signal alone, or said first and second signal jointly, or said first and third signal jointly, to said device under test, and means for at will plotting the amplitudes of responses of said device under test to said signals applied thereto as a function of $f_1$.

8. In combination, for testing an electrical device, a superheterodyne receiver having an intermediate frequency amplifier of frequency IF and a tunable local oscillator of frequency $IF-f_1$, where $f_1$ extends over the audio band, conversion means responsive to said local oscillator for generating frequencies $f_1$, $f_1+\Delta f$ and $nf$, were $\Delta f$ is a fixed low audio frequency, and where $n$ is selected from values ½ and 2, means for at will applying frequencies $f_1$ alone, or $f_1+\Delta f$ and $f_1$ together, or $f_1+\Delta f$ and $nf_1$ together, to said device for generating responses thereof, and means for plotting said responses as a function of the frequency of said local oscillator.

9. In a frequency analyzer, a spectrum analyzer including a spectrum input terminal, a heterodyne mixer coupled to said input terminal, an intermediate frequency amplifier of center frequency IF coupled in cascade with said heterodyne mixer, a detector coupled in cascade with said intermediate frequency amplifier, and a visual indicator having a first coordinate direction representative of frequency and a second coordinate direction representative of amplitude, means responsive to the signal provided by said detector for producing an indication of amplitude in said second coordinate direction, a scanning local oscillator coupled to said heterodyne mixer at will, said scanning local oscillator having frequencies $IF-f_1$, where $f_1$ includes the frequencies of said spectrum, and means for providing said amplitude indications in synchronism with the frequencies of said scanning local oscillator, means for deriving from said local oscillator a scanning spectrum $f_1+\Delta f$, where $f_1$ scans over the first mentioned spectrum and $\Delta f$ is a small increment of frequency, means for deriving from said local oscillator a frequency $f_1$, means for applying said last named frequency $f_1$ and said frequency $f_1+\Delta f$ to a system under test, a fixed frequency oscillator of frequency $IF+\Delta f$ coupled at will to said heterodyne mixer, and means for channeling signal of frequency $\Delta f$ derived from said system under test to said input terminal, and means for deriving from said scanning local oscillator a frequency $nf_1$, where $n$ includes at least values ½ and 2, means for at will applying said frequency $nf_1$ and said frequency $f_1+\Delta f$ to said system under test.

10. In a third order intermodulation distortion analyzer, a source of first signal of frequency $f_1+\Delta f$, where $f_1$ varies over a band of frequencies of interest, and $\Delta f$ is a small increment of frequency, a source of second signal of frequency $nf_1$, where $n$ may have a value ½ or 2, means for applying said first and said second signals simultaneously to a system under test, means for deriving from said system under test a signal of frequency $\Delta f$ representative of said third order intermodulation distortion, and means for plotting the amplitude of said signal of frequency $\Delta f$ as a function of the frequencies of one of said first and second signals.

11. In an intermodulation distortion analyzer, means for generating a first band of frequencies $(nf_1+\Delta f)$, where $n$ is an integer and $\Delta f$ a small frequency increment and $f_1$ a scanning frequency which scans over a band, means for generating a second band of frequencies $nf_1$, where $n$ includes values of ½ and integral values, and where $f_1$ is continuously identical in said first and second bands of frequency, means for applying said first and second bands of frequency to a system under test and for deriving therefrom a signal of frequency $\Delta f$ only, and means for plotting the amplitude of said signal of frequency $\Delta f$ against said frequency $f_1$.

12. A system for measuring distortion of a device under test comprising a first mixer, a narrow frequency band selective circuit connected in cascade with said first mixer, the center frequency of said selective circuit having a frequency IF, a scanning local oscillator having an output connected to said mixer, a reactance modulator for driving said scanning local oscillator, manually controllable tuning means connected to said reactance modulator for control thereof to cause said scanning local oscillator to selectively scan over a frequency range, means responsive to said local oscillator for generating two synchronously scanning local signals $f_1$ and $f_1\pm\Delta f$, where $\Delta f$ is a fixed frequency, means for applying said scanning local signals jointly to said device under test, means for selecting the frequency $\Delta f$ from the output of said device under test continuously in response to scanning of said scanning local signals, means for applying said frequency $\Delta f$ to said first mixer, and means applying a fixed frequency equal to $IF\pm\Delta f$ to said first mixer.

References Cited by the Examiner

UNITED STATES PATENTS

| | | | |
|---|---|---|---|
| 2,588,376 | 3/52 | Fox | 324—57 |
| 2,626,306 | 1/53 | Eicher et al. | 324—57 |
| 2,778,993 | 1/57 | Young | 324—58 |
| 2,897,441 | 7/59 | Schlessel | 324—57 X |
| 2,905,886 | 9/59 | Hupert et al. | 324—57 |
| 2,971,152 | 2/61 | Ranky | 324—57 |
| 3,032,712 | 5/62 | Hurvitz | 324—57 |
| 3,119,062 | 1/64 | Codd | 324—57 |

WALTER L. CARLSON, *Primary Examiner.*